US012046827B2

(12) United States Patent
Boyes

(10) Patent No.: US 12,046,827 B2
(45) Date of Patent: Jul. 23, 2024

(54) VEHICLE ANTENNA APPARATUS, METHOD OF USE AND MANUFACTURE

(71) Applicant: The Secretary of State for Defence, Salisbury (GB)

(72) Inventor: Stephen John Boyes, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 266 days.

(21) Appl. No.: 17/627,284

(22) PCT Filed: Jul. 23, 2020

(86) PCT No.: PCT/GB2020/000066
§ 371 (c)(1),
(2) Date: Jan. 14, 2022

(87) PCT Pub. No.: WO2021/019200
PCT Pub. Date: Feb. 4, 2021

(65) Prior Publication Data

US 2022/0263234 A1 Aug. 18, 2022

(30) Foreign Application Priority Data

Jul. 31, 2019 (GB) ..................................... 1910897

(51) Int. Cl.
*H01Q 21/29* (2006.01)
*H01Q 1/32* (2006.01)
(Continued)

(52) U.S. Cl.
CPC ........... *H01Q 21/29* (2013.01); *H01Q 1/3275* (2013.01); *H01Q 1/3283* (2013.01); *H01Q 5/378* (2015.01); *H01Q 9/42* (2013.01); *H01Q 21/24* (2013.01)

(58) Field of Classification Search
CPC .... H01Q 1/3275; H01Q 1/3283; H01Q 5/378; H01Q 9/42; H01Q 21/24; H01Q 21/29;
(Continued)

(56) References Cited

U.S. PATENT DOCUMENTS 6,864,853 B2 3/2005 Judd et al.
9,196,959 B1 11/2015 Doane et al.
(Continued)

FOREIGN PATENT DOCUMENTS

CN 202651365 U 1/2013
CN 209200134 U 8/2019
(Continued)

OTHER PUBLICATIONS

International Patent Application No. PCT/GB2020/000066, International Preliminary Report on Patentability, dated Feb. 10, 2022.
(Continued)

*Primary Examiner* — Robert Karacsony
(74) *Attorney, Agent, or Firm* — Kilpatrick Townsend & Stockton LLP

(57) ABSTRACT

A vehicle antenna apparatus, including directional antenna elements arranged to be mountable in a distributed array around and pointing away from a vehicle, a powering means configured to power the directional antenna elements in phase with each other, and a method of use and manufacture of the same. The antenna apparatus further includes an omnidirectional antenna arranged to be mountable with the vehicle, with the powering means being further configured to power the omnidirectional antenna in-phase with the directional antenna elements. This provides a combined radiative performance radiating away from the vehicle suitable for communications applications.

23 Claims, 5 Drawing Sheets

(51) Int. Cl.
*H01Q 5/378* (2015.01)
*H01Q 9/42* (2006.01)
*H01Q 21/24* (2006.01)

(58) Field of Classification Search
CPC ... H01Q 21/293; H01Q 21/296; H01Q 21/205
See application file for complete search history.

(56) References Cited

U.S. PATENT DOCUMENTS

| | | | |
|---|---|---|---|
| 2015/0380807 | A1 | 12/2015 | Owen et al. |
| 2017/0110790 | A1 | 4/2017 | Kim |
| 2019/0058248 | A1 | 2/2019 | Kopelman |

FOREIGN PATENT DOCUMENTS

| | | | |
|---|---|---|---|
| CN | 210724828 | U | 6/2020 |
| GB | 2539327 | A | 12/2016 |
| GB | 2539733 | A | 12/2016 |
| GB | 2557629 | A | 6/2018 |
| GB | 2571632 | A | 9/2019 |
| JP | 2012044441 | A | 3/2012 |
| JP | 2019021978 | A | 2/2019 |
| WO | 2004040328 | A1 | 5/2004 |

OTHER PUBLICATIONS

International Patent Application No. PCT/GB2020/000066, International Search Report and Written Opinion, dated Oct. 15, 2020.

United Kingdom Patent Application No. 2011754.5, Combined Search and Examination Report, dated Jan. 18, 2021.

United Kingdom Patent Application No. 1910897.6, Search Report, dated Jan. 21, 2020.

Chattha et al., An Empirical Equation for Predicting the Resonant Frequency of Planar Inverted-F Antennas, IEEE Antennas and Wireless Propagation Letters, vol. 8, 2009, pp. 856-860.

VEHICLE ANTENNA APPARATUS, METHOD OF USE AND MANUFACTURE

TECHNICAL FIELD OF THE INVENTION

This invention relates to the field of vehicle mounted or integrated communications antennas.

BACKGROUND TO THE INVENTION

Vehicle based wireless communications systems are used to send and receive signals over a range of distances and for a variety of purposes. Radio signals are received over relatively large distances to enable in-vehicle entertainment or security systems; wireless signals are communicated between vehicles in smart navigation systems; and relatively short distance signals are transmitted and received in driverless and sensor augmented vehicles to improve the driving experience. All of these applications require a vehicle mounted or integrated communications antenna.

Vehicle antenna apparatus' are particularly prevalent in wheeled vehicles such as cars, lorries and motorbikes. Conventionally these antenna apparatus' have consisted of roof mounted monopole antennas—enabling communication in any azimuth direction. However these antennas provide a relatively low gain performance, are unsightly, and with the desire for more visually appealing vehicles, are now being replaced with compact 'shark-fin' style roof mounted and other integrated omnidirectional antennas. Despite these improvements in aesthetics, an inherent low-gain performance remains which is further compromised by shadowing effects of complex platforms (such as vehicles mounted with roof bars or other obstacles to radiative performance).

In the technical field of driverless or sensor augmented vehicles, precise interrogation of a vehicle's surroundings is necessary in order to generate accurate warnings and guidance instructions to the vehicle and/or driver. This requires the vehicle communication system to be able to discriminate between signals transmitted and received in specific directions. For instance when considering automated braking sensors or parking sensors, signals must be unambiguously received from forwards or rearwards of the vehicle respectively. Omnidirectional antennas are therefore less suited to these applications. Directional antennas mounted to the relevant side of a vehicle (for instance the bumpers) do provide a relatively high gain solution to this requirement. However the inherent directionality comes at the expense of nulls in angular coverage, leading to an inability or weakened ability to communicate in some directions.

Therefore it is an aim of the present invention to provide an alternative vehicle antenna apparatus that mitigates these issues.

SUMMARY OF THE INVENTION

According to a first aspect of the invention there is provided a vehicle antenna apparatus, comprising a plurality of directional antenna elements arranged to be mountable in a distributed array around and pointing away from a vehicle, and powering means configured to power the directional antenna elements in-phase with each other, wherein the antenna apparatus further comprises an omnidirectional antenna arranged to be mountable with the vehicle, the powering means being further configured to power the omnidirectional antenna in-phase with the directional antenna elements, such that in-use the omnidirectional antenna and directional antenna elements deliver a combined radiative performance radiating away from the vehicle. When the plurality of directional antenna elements are driven in-phase with each other, their respective radiation fields will combine to yield a high gain radiation pattern (compared to a conventional omnidirectional antenna) that concentrates radiated power away from the vehicle. Since the amount of power evident at a receiver is directly proportional to the gain of the transmitting antenna, an increase in gain will effectively mean that the input power required by the transmitting antenna can be reduced for a constant power at the receiver. Alternatively the higher gain can be utilised to achieve longer range communications or communications through clutter. However, the combined radiation pattern will be sensitive to the electrical spacing (spacing in wavelengths) of the directional antenna elements. To achieve a combined radiation pattern that is substantially continuously present/stable with angle (no nulling effects that severely compromise communications performance) the physical separation of the antenna elements would need to be greater than 2.5 m at some frequencies. For many vehicles this is not achievable (for instance on a car), the result being a combined radiation pattern that actually has a series of peaks and nulls of gain with angle. These nulls can severely affect communications performance. The inventor has shown that these nulls can be mitigated in a communications antenna by augmenting the array of directional antenna elements with an in-phase omnidirectional antenna. The omnidirectional antenna 'fills' any nulls in the combined radiation pattern to yield a smoother angular communications performance. The overall in-phase combination of the directional antenna elements and omnidirectional antenna yields a vehicle antenna apparatus that provides significantly increased gain performance (by virtue of the directional antenna elements) without compromising overall angular coverage (by virtue of the omnidirectional antenna). Such an antenna apparatus improves long and short range communications from vehicles. The combined angular performance may be continuously present or vary with time. The combined angular performance may be an omnidirectional performance or a continuous performance over a sub-range of angle.

A vehicle antenna apparatus is an antenna configuration used for communicating wireless signals from a vehicle or for receiving wireless signals at a vehicle. The antennas forming the antenna apparatus are mountable with a vehicle—attached upon, or integrated within the bodywork of, the vehicle. An antenna may be mounted to a vehicle by adhesive, screws or bolts, welds, or other fastening means. The antennas may be detachable, to allow for replacement and servicing. Functionally the mounting of the antennas must be sufficient to maintain the antenna located on the vehicle when the vehicle is in use. In particular, the directional antenna elements are mountable to point away from the vehicle.

A directional antenna is an antenna that has directivity—an antenna that is not isotropic or omnidirectional. This is often achieved by providing a ground plate to reflect radiation from one hemisphere into the other hemisphere. A directional antenna array arrangement requires precise configuration. This is partly because the chosen frequency of operation can affect angular coverage and thereby adjust the overall radiation pattern of a distributed array. The direction in which a directional antenna radiates with most gain is considered the antenna boresight. In accordance with the invention, the directional antennas are mountable such that their boresights point away from the vehicle. The distributed array of directional antenna elements may be distributed around part of or all of a vehicle.

The powering means may comprise the vehicle's own on-board battery powering a signal generation means electrically connected to the antennas. This is preferential as it allows the vehicle antenna apparatus to be readily retrofitted to a vehicle. However additional power supplies may be incorporated to increase radiated power or duration of operation. The powering means may also comprise power dividers that equally, or in some other ratio, direct power to the directional antenna elements and omnidirectional antenna. The powering means delivers in-phase power. This means each antenna receives power at zero degrees phase difference to the other antennas. The powering means also incorporates the various cables required to electrically connect to the antennas.

In contrast to a directional antenna, an omnidirectional antenna radiates in all directions within a geometrical plane. In most embodiments of the invention an omnidirectional antenna can be considered an antenna that radiates in all azimuth directions substantially uniformly.

Some embodiments of the vehicle antenna apparatus may operate across a specific sub-range of angles. For instance an array of directional antenna elements may provide a 'comb like' radiation pattern into the forward hemisphere from a vehicle comprising a series of high gain peaks and nulls. An omnidirectional antenna may then provide a 'fill-in' effect to the nulls when powered in-phase with the directional elements. The rearward hemisphere radiation pattern of the omnidirectional antenna may be attenuated, for instance by virtue of a frequency absorbing surface. However in preferred embodiments the combined radiative performance is a complete omnidirectional performance i.e. the directional antenna elements are configured to operate in-phase with each other and have respective directional radiation patterns configured to concentrate radiated power away from the vehicle and to combine with each over to provide an overall substantially omnidirectional performance radiating away from the vehicle, with the omnidirectional antenna being combined in-phase with the directional antenna elements and complementing the radiative performance by compensating for any nulls in the combined radiation pattern. This allows consistent communications to be achieved in any direction, particularly in any azimuth direction, in transmit or receive from a vehicle.

In preferred embodiments the directional antenna elements are directional planar antenna elements. A planar antenna element has a reduced profile and therefore is more visually appealing and readily integrated into or onto vehicle body parts. Planar antennas can also be easier to manufacture. In even more preferred embodiments the directional antenna elements are planar inverted-F antenna (PIFA) elements, each PIFA element comprising a ground plate and radiating top plate. Many planar antennas are omnidirectional, and may only operate as a directional antenna if provided with a ground plate. However this can render the planar antenna acutely narrow band. In contrast a PIFA element can be manufactured to be wideband in operation—for instance the resonant frequency and fractional bandwidth of a PIFA can be carefully optimised by varying the dimensions of a PIFA, as described by Chattha H. T. et al ["An empirical equation for predicting the resonant frequency of planar inverted-F antennas", IEEE Antennas and Wireless Propagation Letters, Vol. 8, 856 {860, August 2009].

In some embodiments comprising PIFA elements, the PIFA elements each comprise at least one parasitic radiator arranged on each respective ground plate. A parasitic radiator increases the impedance bandwidth of an antenna. In these embodiments each parasitic radiator is configured with a predetermined height, width and positioning on each PIFA element. A PIFA element may comprise one or more parasitic radiators depending on desired operating bandwidth.

Preferably in some embodiments comprising PIFA elements, each element comprises a support column attached between the respective ground plate and top plate, the support column being formed from an electrically insulating material. This physically supports the top plate and improves the tolerance of the PIFA element to vibrations and shocks experienced when mounted to a vehicle. Even more preferable is that the support column is formed from Nylon. Nylon is a convenient and relatively inexpensive electrically insulating material that can be machined to provide support columns of various sizes and dimensions. The term 'column' is not intended to have limiting physical dimension, but instead is used to functionally describe a structure that supports the top plate from the ground plate.

In some embodiments each directional antenna element is dual polarised. This may be implemented by each antenna element comprising two orthogonal linear polarisations. This provides an increase in data bandwidth by enabling two channels of communication, but equally provides an ability to communicate in a multipath/clutter environment wherein a received signal may have unpredictable polarisation owing to interactions with obstacles in the environment during transmission. A dual polarised directional antenna element may be implemented for instance by rotating two coplanar antenna elements to remain coplanar but be spatially perpendicular within the same geometrical plane. In particular, a vertical linear polarisation is more effective than a horizontal linear polarisation at achieving communications proximal to the ground. In contract a horizontal linear polarisation is more effective at coupling radiation into the ground. Thereby by providing both linear and horizontal polarisations, both effects can be achieved with the same antenna system.

Each directional antenna element is preferably housed within a respective radome made from, for example, hardened plastic. This protects the antenna element from breakage or damage by abrasion or other direct contact with other surfaces. It is important that the radome itself is transparent to radiation at frequencies that the directional antenna elements are intended to operate. To avoid movement of a directional antenna element within a radome, it may be mounted within the radome using adhesive, screws, bolts, or other mounting means).

In some embodiments the powering means comprises a power divider electrically connected to each of the directional antenna elements and the omnidirectional antenna. Each of the directional antenna elements and the omnidirectional antenna may be provided with an electrical conductor (coaxial line for instance) to allow electrical connection to the powering means. A common source of power (for instance a car battery) may connect to a signal generation means which drives all of the antennas in the antenna apparatus, to facilitate in-phase (zero degree phase) operation. In these embodiments a power divider is necessary which may equally distribute input power to each of the directional antenna elements and omnidirectional antenna elements, or may distribute power by some other ratio, albeit with zero phase difference. In alternative embodiments the powering means comprises first and second power supplies electrically connected to the directional antenna elements and the omnidirectional antenna respectively, wherein the first and second power supplies are synchronised to each other. Each power supply may comprise signal generation means. Separate power supplies may allow for increased operation time, but at the expense of the logistical burden of needing to transport multiple power sources on board a vehicle.

In some embodiments the powering means also comprises a transceiver. Depending on application, this allows transmission and receipt of signals. A signal processing capability may also be provided for processing and decoding received signals.

According to a second aspect of the invention, there is provided a vehicle comprising the vehicle antenna apparatus of the first aspect of the invention. Vehicles according to the invention exhibit increased gain performance when communicating wirelessly, whilst maintaining continuous angular radiative performance. Vehicles benefiting from the invention may be wheeled vehicles such as cars, lorries or motorbikes, or tracked vehicles, and may utilise the vehicle antenna apparatus for long distance communications or short range environmental sensing/autonomous navigation and decision making. The vehicle antenna apparatus can in some embodiments be powered by the vehicle's on board batteries and a signal generation means, the directional antenna elements and omnidirectional antenna mounted to the vehicle externally. This means a vehicle can be retrofitted with an improved communications capability at reduced labour and cost.

Whilst the directional antenna elements can be mounted with (on or inside the structure of) the vehicle in a number of configurations, preferably the elements are mounted with the vehicle to radiate away from the vehicle in the azimuth plane. This provides angular radiation coverage in outboard directions which is most relevant to autonomous navigation and/or inter-vehicle or long range communications.

In some embodiments, the vehicle comprises a vehicle antenna apparatus comprising four directional antenna elements. This provides a directional antenna element strategy that may be mounted with each of the major outboard facing sides of a vehicle (fore/aft/port/starboard) and therefore enables the array of directional elements to radiate in each major outboard direction. However it is even more preferable that the directional antenna elements are mounted as pairs on opposite sides of the vehicle, in particular the fore and aft sides of the vehicle. Having a pair (two complementary) directional antenna elements on a side of vehicle creates a two element array and upon being powered in-phase, a two element array radiation pattern. This provides improved radiative performance in the respective outboard direction. By providing the pairs of elements on opposite sides of the vehicle, each pair operates as a two element array with minimal interference from the other two element array (their spatial and angular separations can be maximised). This is because the pairs of elements will be oriented to face in opposite directions. In these embodiments the omnidirectional antenna, whilst 'filling' any nulls in the radiation patterns of the two element arrays of directional antennas, will also provide the radiative coverage in outboard directions in which no directional antennas are mounted to face.

In other embodiments of the second aspect of the invention, the vehicle antenna apparatus comprises six directional antenna elements. This enables larger vehicles such as lorries to be equipped with a directional antenna element strategy, or allows a smaller vehicle to have additional high gain performance more equally distributed around the vehicle.

It is preferable that each of the directional antenna elements is mounted adjacent an uppermost edge of the vehicle. This positions the directional antenna elements as far from the ground or other terrain as is practically achievable, helping to mitigate propagation losses for given frequencies and distances. The uppermost edge may for instance be where the side of a car meets the bonnet, or where the sides of a lorry meet the roof.

In some embodiments the omnidirectional antenna and directional antenna elements are mounted with the vehicle at different heights. This achieves spatial diversity between the omnidirectional and directional antenna elements in addition to pattern diversity. Optimally the omnidirectional antenna may be mounted on the roof of a vehicle, with the directional antenna elements mounted on a vertically lower portion of the vehicle.

Optionally the directional antenna elements are mounted to be equi-spaced around the vehicle. This allows a symmetric radiation pattern to be generated radiating substantially omnidirectionally away from the vehicle.

Whilst the vehicle to which the vehicle antenna apparatus is mounted may be any vehicle, most practical applications envisaged comprise a wheeled vehicle. The antenna apparatus provides improved radiative performance in a relatively compact manner, and overcomes problems associated with closely spaced directional antenna elements. Therefore the invention is considered most applicable to space constrained vehicles such as cars, lorries, motorbikes and other wheeled vehicles.

According to a third aspect of the invention, there is provided the use on a vehicle of an omnidirectional antenna and plurality of directional antenna elements powered in-phase to deliver a combined radiative performance radiating away from the vehicle. Prior art antenna apparatus' for vehicles comprise either omnidirectional antennas for wide angle coverage or a directional antenna for focused short range interrogation of vehicle environments or obstacles. The inventor has overcome issues surrounding gain performance of omnidirectional antennas by providing directional antennas on vehicles as an array, and has further overcome array nulls by combining such an array with an omnidirectional antenna. The in-phase combination provides a more continuous and stable angular coverage, which may be an omnidirectional coverage.

According to a fourth aspect of the invention, there is provided a method of communicating to or from a vehicle, comprising the steps of: providing a vehicle comprising the vehicle antenna apparatus of the first aspect of the invention; and then transmitting or receiving a wireless communication signal using the vehicle antenna apparatus. The method provides for high gain wireless communication to or from a vehicle, whilst compensating for nulling effects that occur when antennas are mounted in close spatial proximity.

According to a fifth aspect of the invention, there is provided a method of manufacturing a vehicle having a vehicle antenna apparatus, comprising the steps of: providing a vehicle having powering means; mounting a plurality of directional antenna elements in a distributed array around the vehicle; mounting an omnidirectional antenna with the vehicle; electrically connecting the directional antenna elements and omnidirectional antenna to the powering means; and then configuring the powering means to power the omnidirectional antenna and directional antenna elements in-phase with each other. This method allows a vehicle antenna apparatus with improved power delivery to be integrated into a vehicle without compromising consistency of angular coverage.

According to a sixth aspect of the invention, there is provided a planar inverted-F antenna for use in a vehicle antenna apparatus, comprising a ground plate and radiating top plate, the radiating top plate being supported from the ground plate by a non-electrically conductive support column. The support column may be formed from Nylon. The provision of a support column maintains the position of the radiating top plate from the ground plate when the PIFA is mounted upon and used with a vehicle. Vibrations and jolts experienced in a vehicle environment can cause distortion of, or breakage of, antenna elements. This can affect communications performance. By providing a support column the planar inverted-F antenna is more tolerant to such environments.

BRIEF DESCRIPTION OF THE DRAWINGS

Embodiments of the invention will now be described by way of example only and with reference to the accompanying drawings, in which.

DETAILED DESCRIPTION

Figure 1A:
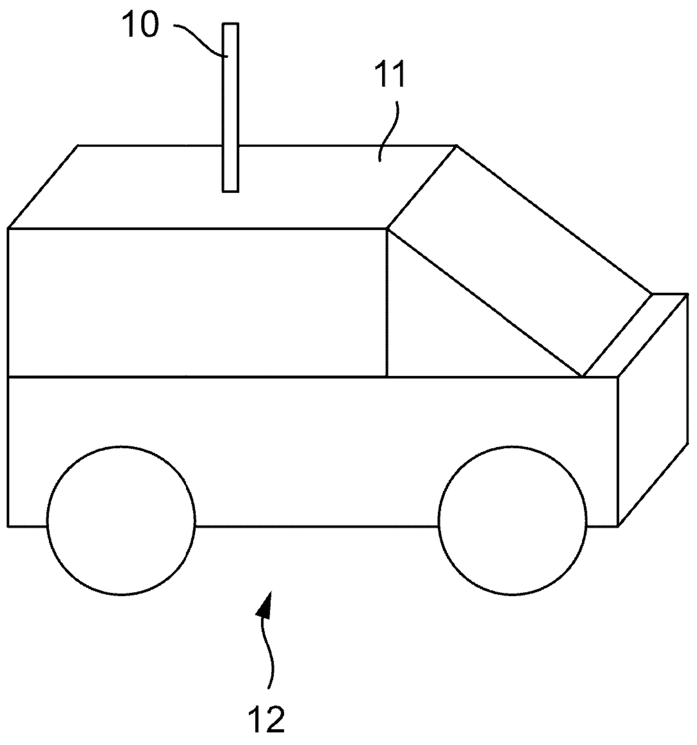
Fig. 1A Prior Art
FIG. 1*a* illustrates in perspective-view an example of a prior art omnidirectional antenna mounted to a vehicle.

FIG. 1*a* illustrates in perspective-view an example of a prior art omnidirectional antenna 10 mounted to the roof 11 of a wheeled vehicle 12. The omnidirectional antenna 10 is located approximately centrally upon the roof 11 and protrudes vertically therefrom. The omnidirectional antenna 10 is a conventional whip type monopole antenna that radiates in all azimuth directions outboard of vehicle 12. The omnidirectional antenna 10 is considered low gain.

Figure 1B:
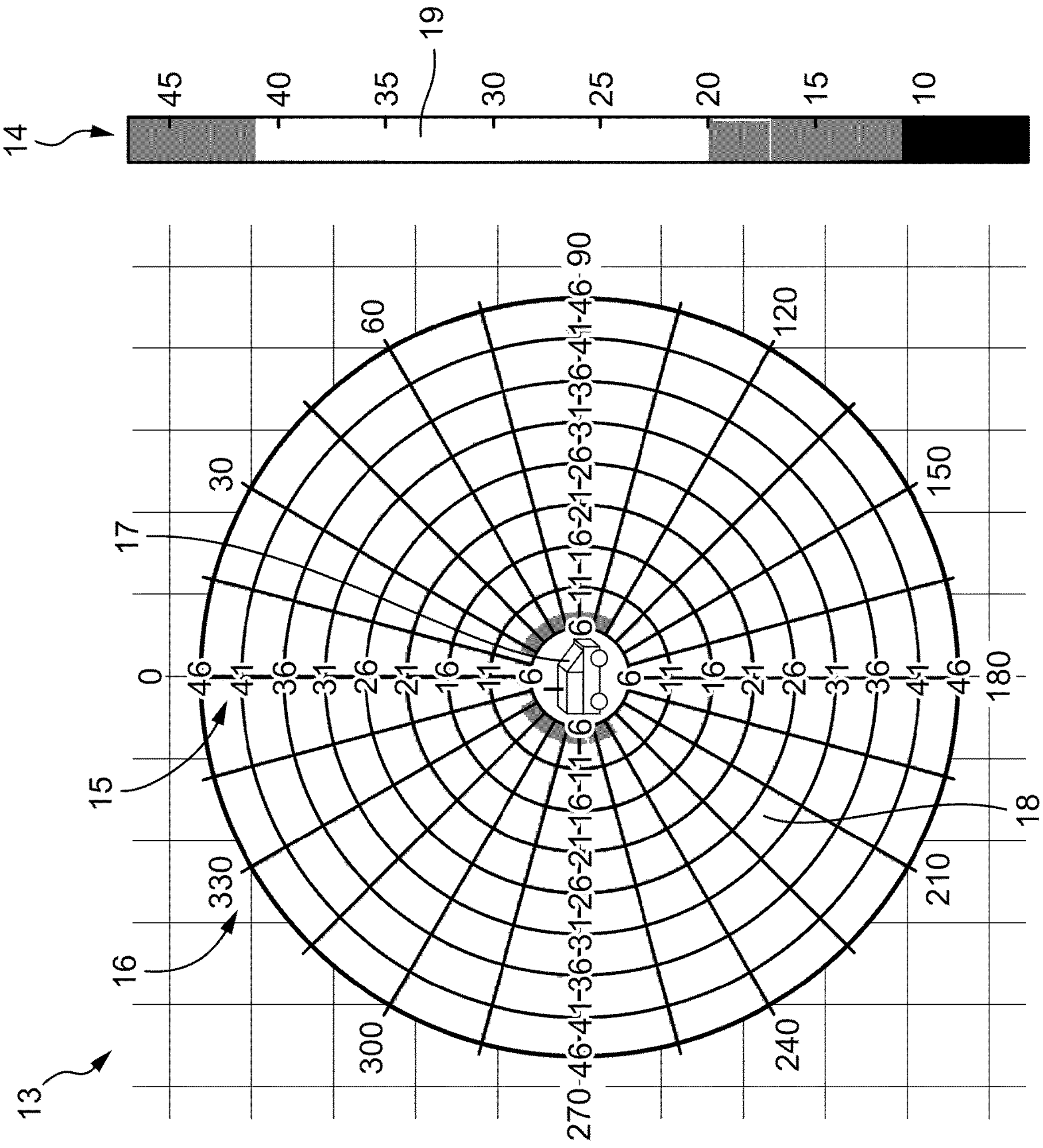
Fig. 1B Prior Art
FIG. 1*b* illustrates a representation of the electric field strength profile for the prior art omnidirectional antenna of FIG. 1*a;*

FIG. 1*b* illustrates a representation of the electric field strength profile 13 for the prior art omnidirectional antenna shown in FIG. 1*a*. The profile 13 is a polar plot showing electric field strength 14 at a plurality of ranges 15 and bearings 16 from a vehicle mounted antenna apparatus 17. The profile 13 indicates substantially continuous electric field strengths with angle. For example, similar electric field strengths 19 are achieved at similar ranges 18 from the vehicle antenna apparatus 17.

Figure 2A:
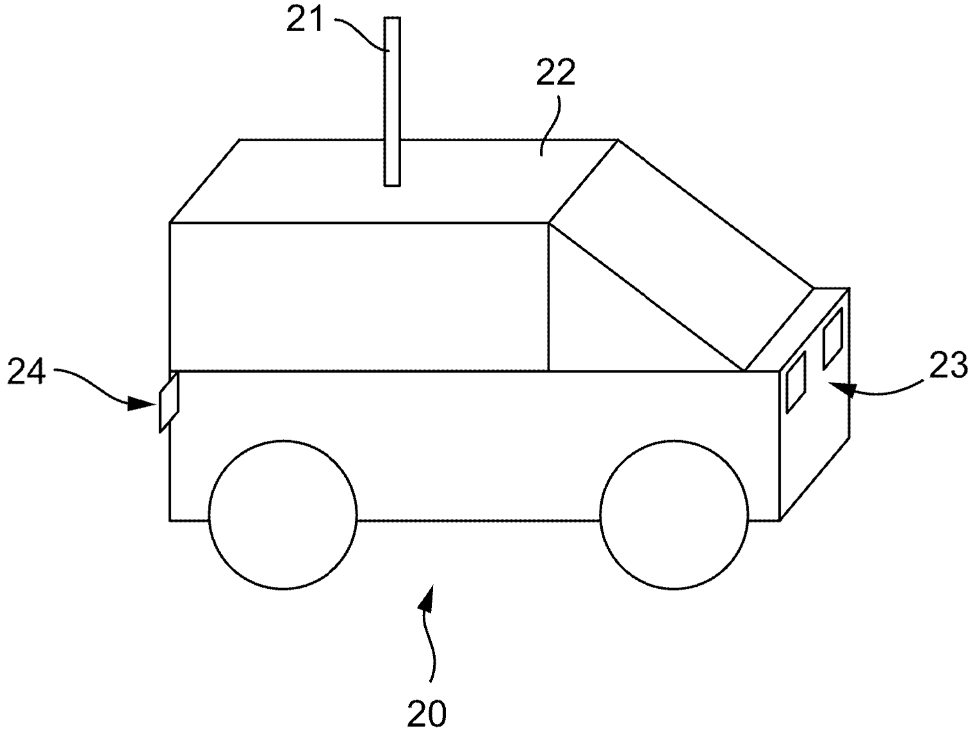
FIG. 2*a* illustrates in perspective-view an embodiment of a vehicle comprising a vehicle antenna apparatus.

FIG. 2A illustrates in perspective-view an embodiment of a vehicle 20 comprising a vehicle antenna apparatus. The vehicle antenna apparatus itself comprises an omnidirectional antenna 21 mounted atop roof 22 of vehicle 20. The omnidirectional antenna 21 is mounted substantially centrally on the roof 22. The omnidirectional antenna 21 is a conventional antenna, also shown in FIG. 1A. In addition to the omnidirectional antenna 21, there is also provided a first pair of directional antennas 23 surface mounted to the front of the vehicle 20. The first pair of directional antennas 23 are mounted to the front of vehicle 20 adjacent the bonnet. The first pair of directional antennas 23 is also mounted towards the corners of the front of vehicle 20. For most vehicles 20 the first pair of directional antennas 23 in this position would be in the vicinity of, but not blocking, the head lights. Also shown is a second pair of directional antennas 24 mounted on the rear side of the vehicle 20. The front and rear sides of the vehicle 20 face opposing outboard directions. The second pair of directional antennas 24 at mounted at the same height as the first pair of directional antennas 23—they can be considered to be in the same geometrical plane. Both the first and second pairs of directional antennas 23, 24, are arranged to radiate outboard of the vehicle 20. The remaining sides of the vehicle 20 do not comprise antenna elements. There are a total of four directional antenna elements used in this embodiment. The directional antenna elements forming the pairs 23 and 24 are of identical polarisation. Each pair of directional antenna elements 23 and 24 forms a two element array. The pairs 23 and 24 are powered in-phase with each other and the omnidirectional antenna 21. The powering means (not shown) comprises a power splitter equally dividing power from a signal generation means itself powered from the vehicle's 20 own battery. Each of the directional antennas in the pairs 23 and 24 comprises a planar inverted-F antenna (PIFA) inside a radome (formed of for instance, hardened plastic). Coaxial cabling is used to connect the PIFAs to the source of power.

Figure 2B:
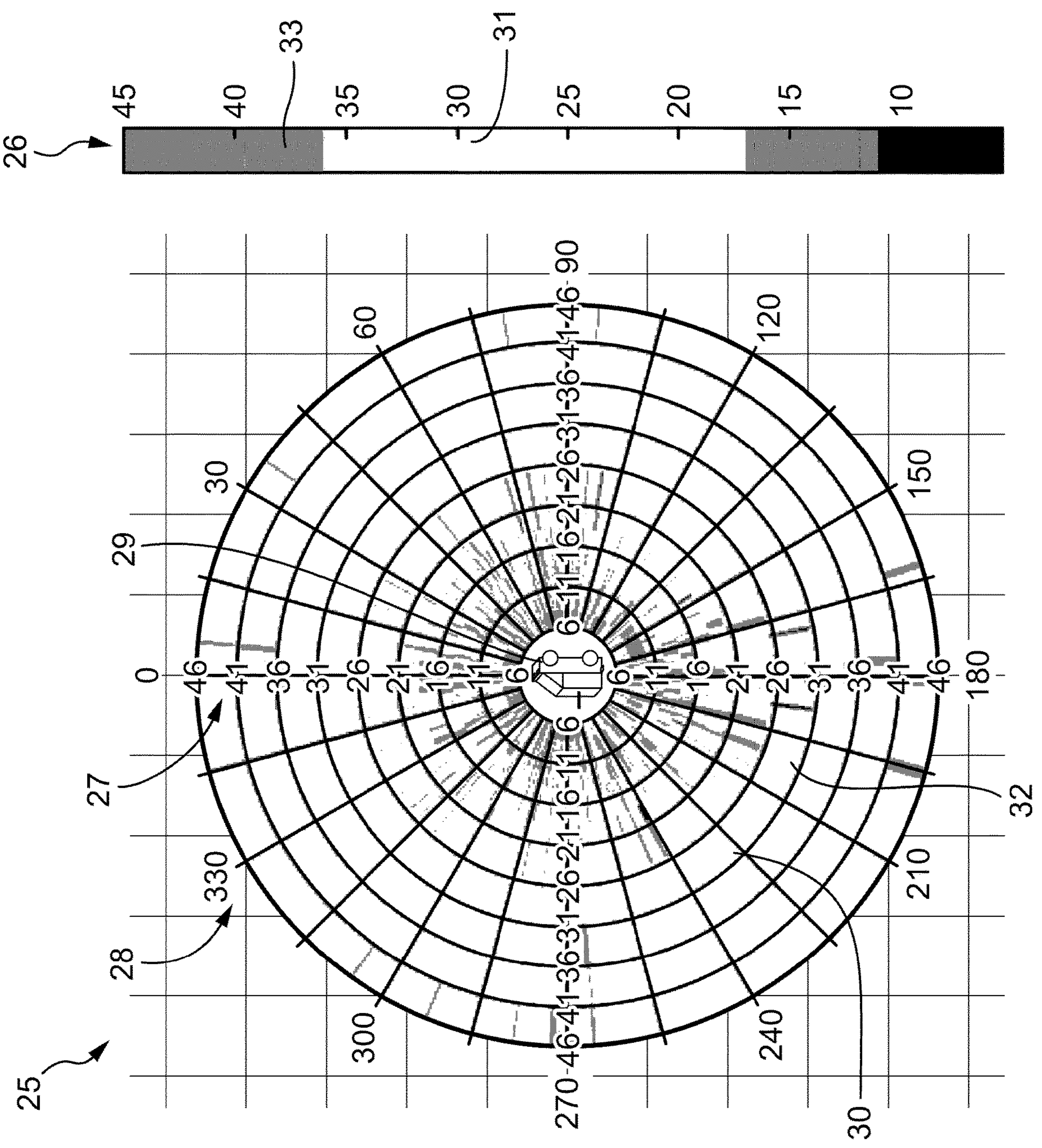
FIG. 2*b* illustrates a representation of the electric field strength profile for the vehicle antenna apparatus of FIG. 2*a*.

FIG. 2*b* illustrates a representation of the electric field strength profile 25 for vehicle antenna apparatus shown in FIG. 2*a*. The profile 25 is a polar plot showing electric field strength 26 at a plurality of ranges 27 and bearings 28 from a vehicle mounted antenna apparatus 29. The profile 25 indicates a plurality of peaks in radiative performance 32 having relatively high electric field strengths 33. These peaks 32 are as a result of the pairs of directional antenna elements 23 and 24 in FIG. 2*a* and are a significant improvement in performance over the prior art example shown in FIG. 1*a*-1*b*. Between the peaks 32 in the present figure, the nulls are filled with a radiative baseline performance 30 of electric field strength 31. This is the effect of the omnidirectional antenna 21 in FIG. 2A. The omnidirectional antenna 21 is mitigating the significant nulls that would otherwise be seen with an array of directional antenna elements in relatively close spatial proximity. The inventor has shown that a 5-9 dB increase in radiative performance over the prior art can be achieved from the vehicle 20 whilst maintaining a substantially continuously present radiative performance with angle.

In use, the pairs of directional antenna elements 23 and 24, and the omnidirectional antenna 21 are driven with signals in-phase by a powering means. The phase relationship between the signals received by each antenna is critical in determining how the respective electromagnetic fields combine and interact with each other. Owing to in-phase powering of the pairs 23 and 24 of directional antenna elements, the radiation pattern from each pair 23 and 24 forms as the product of the radiation patterns of the single directional antenna elements forming each pair 23 and 24, now multiplied by a two element array factor. This yields a combined higher gain radiation pattern from each pair 23 and 24 of directional antenna elements. Owing to the spatial proximity of the directional antenna elements in each pair 23 and 24, the combined radiation pattern will not be smooth—it will comprise significant nulls in performance at certain radiative angles. These patterns are therefore not considered stable or substantially continuously present with angle. This 'comb-like' radiation pattern is compensated for by additionally powering the omnidirectional antenna 21 in-phase with the pairs of directional elements 23 and 24. The radiation pattern from the omnidirectional antenna 21 mitigates the nulls in the radiation pattern from the pairs of directional antennas 23 and 24. The combined antenna apparatus can therefore provide improved power delivery owing to the use of directional antenna element pairs 23 and 24, whilst maintaining substantially continuously present with angle omnidirectional performance through use of the omnidirectional antenna 21. All antennas are considered coherent—however the omnidirectional antenna 21 and the pairs of directional antennas 23 and 24 are located at different heights above, for instance, ground level. This introduces a spatial diversity characteristic that can be exploited for some applications.

Whilst the embodiments shown in FIGS. 2A-2B use four directional antenna elements, embodiments comprising 6 directional antenna elements have been shown to also offer improvements over standalone omnidirectional antennas with respect to radiative performance. The precise number of directional antenna elements used may be determined from the beam width of each directional antenna at the chosen frequency of operation. For instance when using a very narrow beamwidth directional antenna element, a greater number of elements will be needed to secure high radiative power performance across an angular range. In addition, dependent on frequency of operation, the nulls in the directional element array pattern may be more significant, further demonstrating the benefit of combining an in-phase omnidirectional antenna. The directional antenna elements in any embodiment may be equally spaced around a vehicle.

Figure 3:
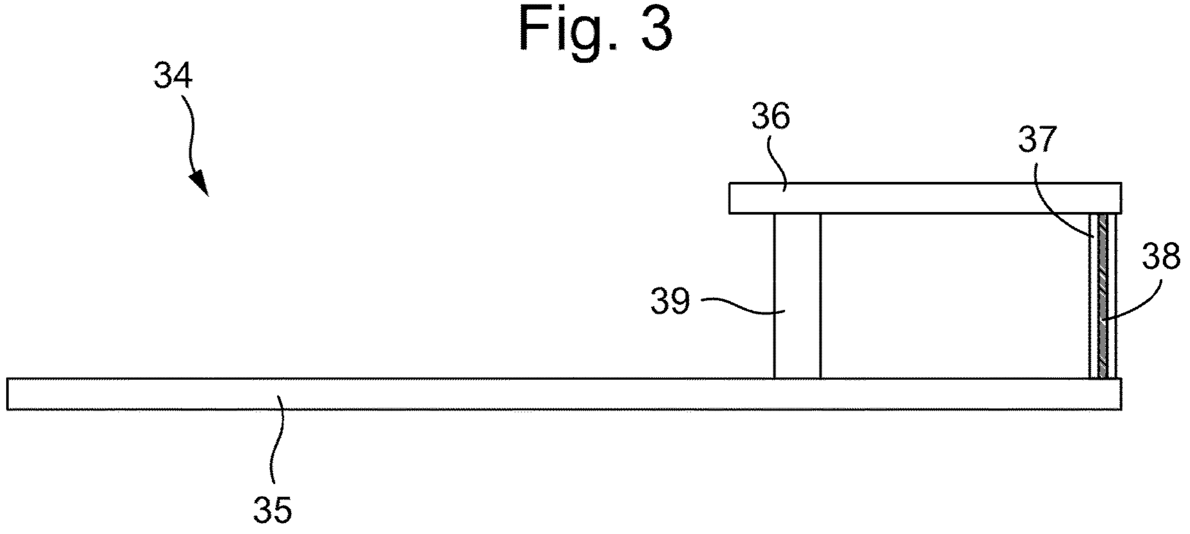
FIG. 3 illustrates in side-view an embodiment of a PIFA antenna element for use in a vehicle antenna apparatus.

FIG. 3 illustrates in side-view an embodiment of a PIFA antenna element 34 for use in a vehicle antenna apparatus. The PIFA element 34 comprises a ground plate 35 parallel to but spatially separated from radiating top plate 36. Both ground plate 35 and top plate 36 are formed from metal and are rectangular in shape. Located between the ground plate 35 and top plate 36, and at their peripheries, are shorting pin 38 and feed plate 37. In this view the shorting pin 38 appears in front of the feed plate 37. These are known features of PIFAs that can be configured according to usage requirements. The figure also shows a support column 39. The support column 39 is cylindrical and spans the gap between the ground plate 35 and top plate 36. The support column 39 partially supports the weight of the top plate 36 and maintains the separation between the top plate 36 and ground plate 35. The support column 39 is located proximal the adjacent edge of top plate 36 to the shorting pin 38 and feed plate 37. The support column 39 is formed from Nylon and is screwed to the top plate 36 and ground plate 35. PIFA elements typically comprise a top plate that is unsupported at, in many cases, all bar one edge. The only supported edge may be supported solely by the feed and shorting pin, themselves merely being weakly welded to the top plate. During use on vehicles, such 'overhanging' top plates may sheer from their feed plates and shorting pins as a result of vibrations or jolts. If such PIFAs do not catastrophically break, they may deform affecting performance. Provision of the non-conducting support column 39 mitigates this issue.

The invention claimed is:

1. A vehicle antenna apparatus, comprising:

a plurality of directional antenna elements arranged to be mountable in a distributed array around and pointing away from a vehicle, and powering means configured to power the directional antenna elements in-phase with each other and an omnidirectional antenna arranged to be mountable with the vehicle, wherein the powering means is further configured to power the omnidirectional antenna in-phase with the directional antenna elements, such that in-use the omnidirectional antenna and directional antenna elements deliver a combined radiative performance radiating away from the vehicle.

2. The vehicle antenna apparatus of claim 1, wherein the combined radiative performance is an omnidirectional performance.

3. The vehicle antenna apparatus of claim 1, wherein the directional antenna elements are directional planar antenna elements.

4. The vehicle antenna apparatus of claim 3, wherein the directional antenna elements are planar inverted-F antenna (PIFA) elements, each PITA element comprising a ground plate and radiating top plate.

5. The vehicle antenna apparatus of claim 4, wherein the PIFA elements each comprise at least one parasitic radiator arranged on each respective ground plate.

6. The vehicle antenna apparatus of claim 4, wherein the PIFA elements each comprise a support column attached between the respective ground plate and top plate, the support column being formed from an electrically insulating material.

7. The vehicle antenna apparatus of claim 6, wherein the support column is formed from Nylon.

8. The vehicle antenna apparatus of claim 1, wherein each directional antenna element is dual polarised.

9. The vehicle antenna apparatus of claim 1, wherein each directional antenna element is housed within a respective radome.

10. The vehicle antenna apparatus of claim 1, wherein the powering means comprises a power divider electrically connected to each of the directional antenna elements and the omnidirectional antenna.

11. The vehicle antenna apparatus of claim 1, wherein the powering means comprises first and second power supplies electrically connected to the directional antenna elements and the omnidirectional antenna respectively, wherein the first and second power supplies are synchronised to each other.

12. The vehicle antenna apparatus of claim 1, wherein the powering means comprises a transceiver.

13. A vehicle comprising the vehicle antenna apparatus of claim 1.

14. The vehicle of claim 13, wherein the directional antenna elements are mounted with the vehicle to radiate away from the vehicle in an azimuth plane.

15. The vehicle of claim 13, comprising four directional antenna elements.

16. The vehicle of claim 15, wherein the directional antenna elements are mounted as pairs on opposite sides of the vehicle.

17. The vehicle of claim 13, comprising six directional antenna elements.

18. The vehicle of claim 13, wherein each of the directional antenna elements is mounted adjacent an uppermost edge of the vehicle.

19. The vehicle of claim 13, wherein the omnidirectional antenna and the directional antenna elements are mounted with the vehicle to be at different heights.

20. The vehicle of claim 13, wherein the directional antenna elements are mounted to be equi-spaced around the vehicle.

21. The vehicle of claim 13, wherein the vehicle is a wheeled vehicle.

22. A method of communication to or from a vehicle, the method comprising:

providing a vehicle comprising the vehicle antenna apparatus of claim 1; and transmitting or receiving a wireless communication signal using the vehicle antenna apparatus.

23. A method manufacturing a vehicle having a vehicle antenna apparatus, the method comprising:

providing a vehicle having a powering means;

mounting a plurality of directional antenna elements in a distributed array around the vehicle;

mounting an omnidirectional antenna with the vehicle;

electrically connecting the directional antenna elements and omnidirectional antenna to the powering means; and configuring the powering means to power the omnidirectional antenna and directional antenna elements in-phase.

* * * * *